V. J. EMERY.
CLUTCH MECHANISM.
APPLICATION FILED APR. 13, 1906.
936,102.
Patented Oct. 5, 1909.
2 SHEETS—SHEET 1.
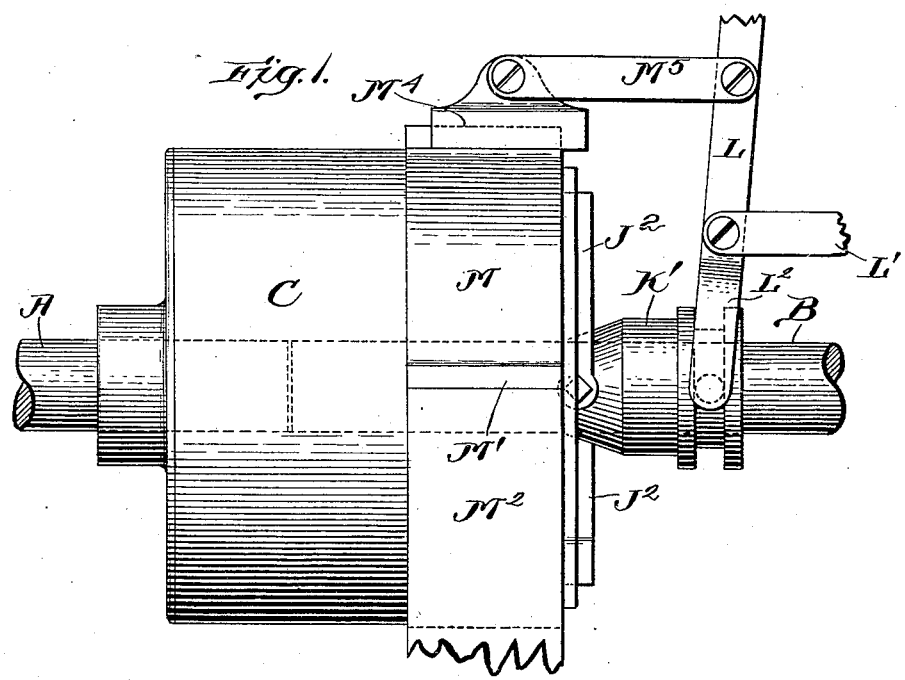
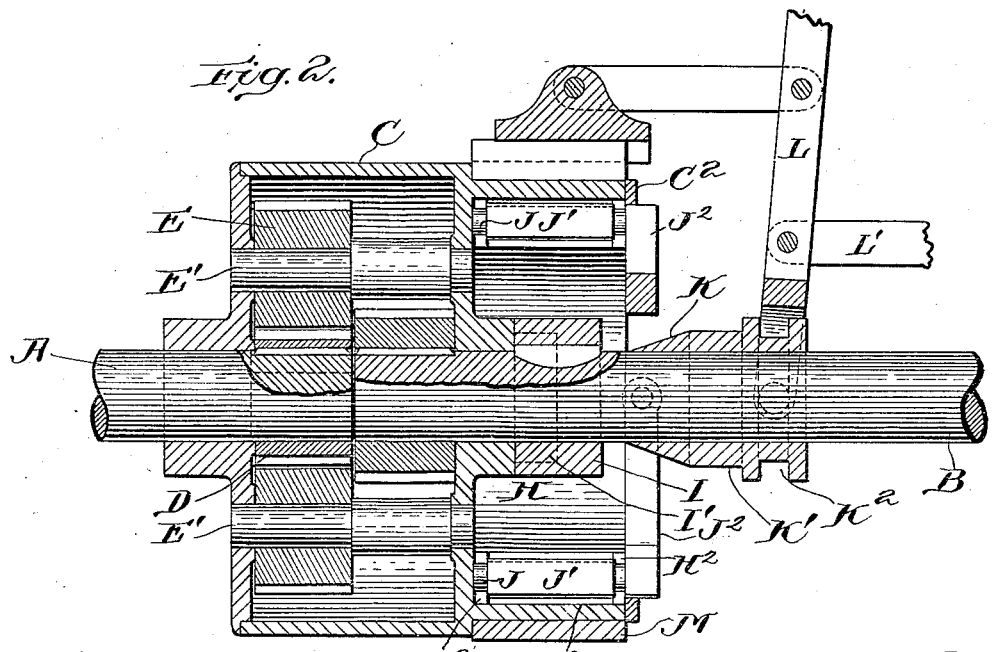
Witnesses:
Geo. N. Goddard
Katharine A. Dugan
Inventor:
Victor J. Emery
by Ira L. Fish
Attorney.

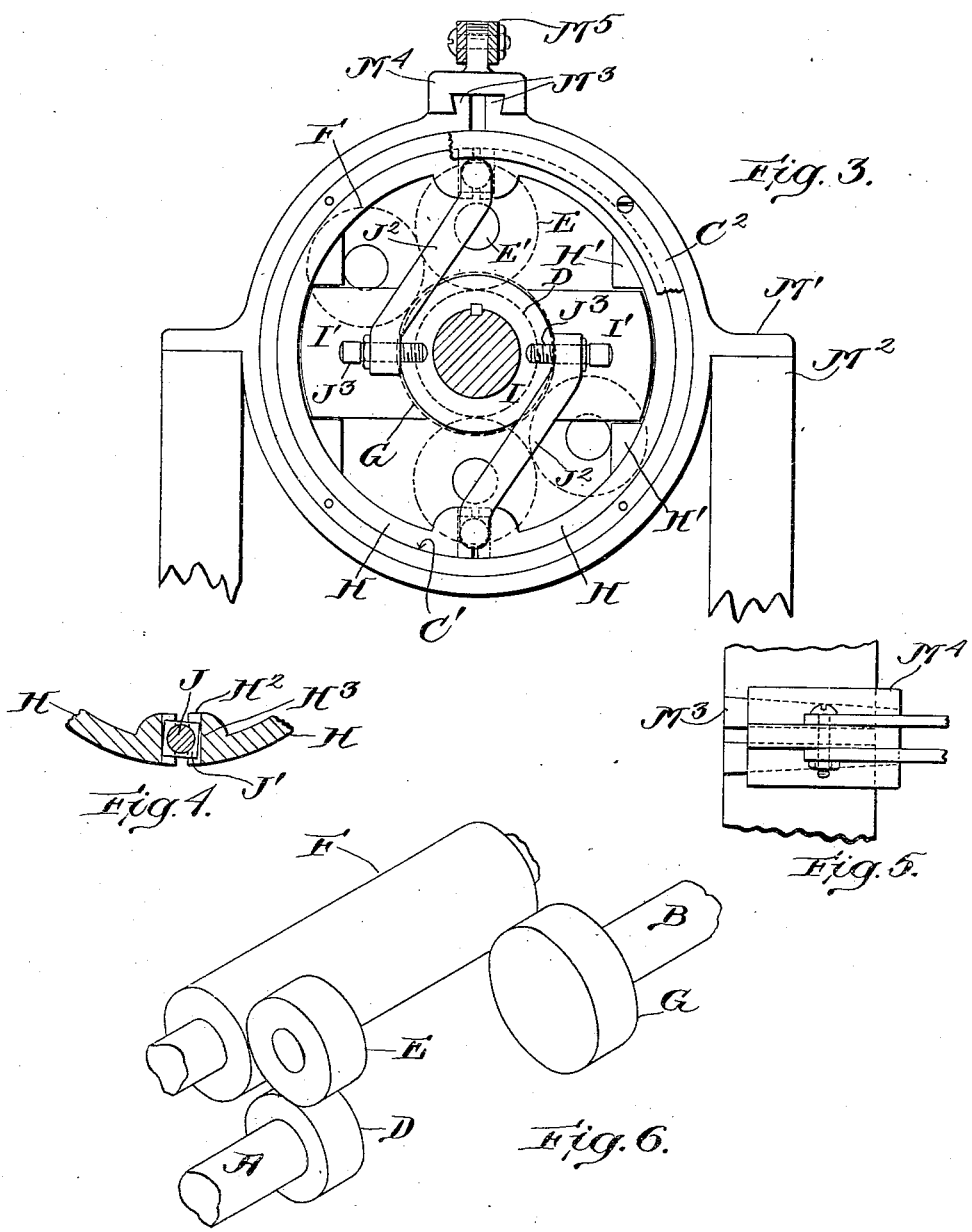

UNITED STATES PATENT OFFICE.

VICTOR J. EMERY, OF QUINCY, MASSACHUSETTS.

CLUTCH MECHANISM.

936,102.  Specification of Letters Patent.  Patented Oct. 5, 1909.

Application filed April 13, 1906. Serial No. 311,497.

*To all whom it may concern:*

Be it known that I, VICTOR J. EMERY, citizen of the United States, and resident of Quincy, county of Norfolk, Massachusetts, have invented certain new and useful Improvements in Clutch Mechanism, of which the following is a specification.

The invention relates to a clutch mechanism and has for its object to provide a simple and efficient mechanism, the parts of which may be readily assembled or removed for the purpose of inspection or repair.

The invention consists of the various features and combinations hereinafter described and referred to in the claims.

The various features of the invention will be understood from the following detailed description of a mechanism in which I have embodied them and which is shown in the accompanying drawings.

In these drawings—Figure 1 is a side elevation of a clutch mechanism embodying the various features of the invention. Fig. 2 is a vertical longitudinal section. Fig. 3 is a sectional elevation looking toward the left in Fig. 2. Figs. 4 and 5 are details of certain parts to be hereinafter described; and Fig. 6 is a diagrammatic view showing the arrangement of the gearing for connecting the driving and driven shafts.

In the construction shown in the drawings the features of the invention are embodied in a mechanism especially adapted for driving the propeller shaft of small launches or yachts, although the mechanism may be employed wherever it is desired to connect a driving and driven shaft so that the driven shaft may be driven in either direction and the direction of rotation readily reversed.

In the construction shown the driving shaft is indicated at A and the driven shaft at B the shafts being arranged in axial alinement with each other. Loosely mounted on the shafts is a casing C which forms one part of the clutch for connecting the shafts and also forms the support or carrier for the reversing gearing connecting the two shafts. The gearing carried by the casing C and connecting the two shafts A and B is similar to the gearing heretofore employed in driving reversing mechanisms of the general type herein shown and comprises a gear D secured to the end of shaft A and engaging two gears E mounted upon the studs E′ which are arranged on diametrically opposite sides of the gear D. The gears E engage gears F which are of sufficient length to not only mesh with the gears E but also to mesh with a gear G secured to the end of the driven shaft B. When the casing C is held from rotation it acts as a stationary support for the intermediate gearing connecting the shafts A and B and the shaft B is driven from the shaft A through this gearing and in a reverse direction.

The casing C is provided with an internal cylindrical surface C′ which forms a frictional clutch surface for coöperating with two segmental clutch shoes H. The clutch shoes H fit within the cylindrical friction surface C′ and are connected with the shaft B by means of a head I which is keyed to the shaft B and is provided with two radially extending arms I′. Each of the clutch shoes is provided with radially extending lugs H′ arranged to embrace the opposite sides of the arms I′ of the head I so that the clutch shoes and shaft B will rotate together. The clutch shoes are operated to engage the frictional surface C′ and thus connect the casing C with the head I and shaft B by means of spreading devices arranged between the adjacent ends of the clutch shoes. These spreading devices consist of shafts J which are journaled in lugs H² formed on the ends of the clutch shoes H. The shafts J are provided with rectangular portions J′ which lie between the lugs H² and form cams for acting against the adjacent ends H³ of the clutch shoes when the shafts are turned from the position indicated in Fig. 4. The shafts J are provided with inwardly projecting arms J² at their outer ends which project inwardly on opposite sides of the shaft B. These arms are provided at their inner ends with adjustable bolts J³ which extend radially inward on opposite sides of the shaft B into position to be engaged and operated by the conical surface K of an operating sleeve K' which is mounted on the shaft B. The clutch shoes H are held within a cylindrical recess in the casing C by an annular ring C² secured to the end of the casing C and overlapping the clutch shoes H.

With the parts of the clutch constructed and arranged as described, the clutch shoes H and the operating devices therefor may be readily and conveniently assembled and may be readily and quickly removed from the clutch member C by simply removing the annular ring C². When the ring C² is removed the clutch shoes and operating shafts may be withdrawn from the cylindrical recess within the casing C, since the connection between the head I and the shoes does not interfere with the movement of the shoes longitudinally of the clutch member C. The clutch devices described also provide a simple construction which may be cheaply manufactured and which will operate in an efficient and reliable manner without danger of getting out of order or requiring continual care and adjustment.

The sleeve K' is operated to force the clutch shoes H into engagement with the friction surface on the clutch member C or to release the clutch shoes so that they may rotate freely with relation to the clutch member C by means of a lever L pivoted to a fixed arm L' and provided at its lower end with a yoke L² the arms of which are provided with pins engaging an annular groove K² in the sleeve K'.

When the clutch shoes are forced against the clutch surface of the casing C the casing is rigidly connected to the shaft B and this shaft is driven from the driving shaft A through the casing C and the clutch and shafts rotate in the same direction and at the same speed. When it is desired to reverse the rotation of the shaft B the clutch is operated to release the clutch shoes H from engagement with the casing C and the casing is held from rotation by means of a brake strap M which surrounds the casing C and is operated to clamp the casing and prevent its rotation when the clutch is disengaged. The brake strap M is provided with laterally extending arms M' which engage fixed supports M² so that the strap is held from rotation. The strap is in the form of a split ring and the ring is of such a size that unless the ends of the ring are drawn together the casing C may rotate freely within the ring. For the purpose of operating the clamping strap to prevent the rotation of the casing C, the ends of the strap are provided with ribs M³ having diverging outer edges and these ribs are engaged by a slide M⁴ which is provided with diverging engaging surfaces for coöperating with the edges of the ribs M³. The slide M⁴ is connected by a link M⁵ with the lever L so that when the lever M is operated to disengage the clutch, the slide M⁴ will be operated to draw the ends of the clamping strip together, thus securely holding the casing C. When the lever L is moved in the opposite direction to engage the clutch, the slide M⁴ is operated to release the clamping strip so that the casing C is free to rotate.

Without attempting to point out the different constructions and arrangements in which the features of the invention may be embodied, what I claim and desire to secure by Letters Patent is:—

1. A clutch mechanism comprising a clutch member having an internal cylindrical surface, semi-cylindrical clutch shoes, bearings formed in the adjacent ends of the shoes, shafts journaled between the ends of the shoes in said bearings and provided with spreading devices between the ends of the shoes, arms secured to the ends of the shafts, and an operating sleeve having a conical surface engaging the inner ends of the arms, substantially as described.

2. A clutch mechanism comprising a clutch member having an internal cylindrical surface, semi-circular clutch shoes, shafts journaled in the ends of the shoes and provided with spreading devices, lugs on the shoes, and a head provided with radially projecting arms embraced by the lugs, substantially as described.

3. A clutch mechanism comprising a clutch member C provided with a clutch surface C', clutch shoes H provided with lugs H² at their ends, shafts J journaled in the lugs H² and having rectangular parts between the lugs, arms J² on the ends of the shafts, a shaft B, an operating sleeve on the shaft, a head I secured to the shaft B provided with arms I' and lugs H' on the shoes H embracing the arms I', substantially as described.

4. A clutch mechanism comprising a clutch member having an internal cylindrical surface, semicircular clutch shoes, shafts journaled in the ends of the shoes and provided with spreading devices, arms on the ends of the shafts, a shaft, a sleeve on said shaft provided with a conical surface for operating the arms, a head secured on the shaft provided with radial arms, and lugs on the shoes embracing the arms, substantially as described.

5. A clutch mechanism comprising a clutch member C provided with a clutch surface C', clutch shoes H provided with lugs H² at their ends, shafts J journaled in the lugs and having eccentric parts between the lugs, arms J² on the ends of the shaft, and an operating sleeve K', substantially as described.

6. A clutch mechanism comprising a clutch member having an internal cylindrical surface, semi-cylindrical clutch shoes provided in their adjacent ends with semicircular bearings, shafts journaled and supported in said bearings between the ends of the shoes and provided with spreading devices, arms secured to the ends of the shafts, and an operating sleeve having a conical surface engaging the inner ends of the arms, substantially as described.

In witness whereof, I have hereunto set my hand, this 7th day of April, 1906.

VICTOR J. EMERY.

In the presence of—
JOSEPH D. MCINTYRE,
IRA L. FISH.